United States Patent [19]

Schlattl

[11] Patent Number: 5,507,268
[45] Date of Patent: Apr. 16, 1996

[54] DEVICE FOR REMOVING OIL AND/OR SOOT FROM A STREAM OF AIR, GAS AND OR VAPOR, PARTICULARLY FOR USE IN COMBUSTION ENGINES

[76] Inventor: Alice Schlattl, Osserstrasse 1, Ruderting, Germany, 94162

[21] Appl. No.: 342,704

[22] Filed: Nov. 21, 1994

[30] Foreign Application Priority Data

Sep. 8, 1994 [DE] Germany .......................... 44 31 906.1
Oct. 1, 1994 [DE] Germany .......................... 44 35 273.5

[51] Int. Cl.$^6$ ............................ F02B 25/06; F01M 13/04
[52] U.S. Cl. ........................................ 123/572; 55/DIG. 19
[58] Field of Search .................................. 123/572, 573; 55/DIG. 19

[56] References Cited

U.S. PATENT DOCUMENTS

| | | | |
|---|---|---|---|
| 2,731,958 | 6/1956 | Robley | 55/DIG. 19 |
| 3,664,314 | 5/1972 | Lamkin | 123/573 |
| 3,721,069 | 3/1973 | Walker | 55/DIG. 19 |
| 4,089,309 | 5/1978 | Bush | 55/DIG. 19 |
| 4,269,607 | 5/1981 | Walker | 123/573 |
| 4,453,525 | 6/1984 | DeBrules | 123/573 |
| 4,502,424 | 3/1985 | Katoh et al. | 123/572 |
| 4,723,529 | 2/1988 | Yokoi et al. | 123/573 |
| 4,790,287 | 12/1988 | Sakurai et al. | 123/573 |
| 5,024,203 | 6/1991 | Hill | 123/572 |
| 5,329,913 | 7/1994 | Suzuki et al. | 123/573 |

*Primary Examiner*—David A. Okonsky
*Attorney, Agent, or Firm*—Rosenman & Colin

[57] ABSTRACT

A device for the separating of oil and/or soot from a stream of air, gas and/or vapor, particularly for combustion engines, characterized by at least one drum which is arranged in a closed chamber and can be driven in rotation by a drive around a longitudinal axis or drum axis, the drum forming an inner space and a plurality of openings being provided in screen-like manner on a part of its wall which surrounds the axis of the drum and limits the inner space, through which openings the individual spaces formed by the inner space of the drum and the part of the chamber surrounding the drum are in communication, by at least one first connection debouching into on of the individual spaces for the feeding of the stream of air, gas and/or vapor, and by a second connection debouching into the other individual space for the discharge of a purified stream of air, gas and/or vapor and/or of a stream of air, gas and/or vapor which has been freed from oil and/or soot.

18 Claims, 2 Drawing Sheets

DEVICE FOR REMOVING OIL AND/OR SOOT FROM A STREAM OF AIR, GAS AND OR VAPOR, PARTICULARLY FOR USE IN COMBUSTION ENGINES

The present invention relates to a device for removing oil and/or soot from a stream of air, gas and/or vapor, particularly for use in combustion engines.

In combustion engines, particularly in Otto and diesel engines, it is necessary to vent the engine spaces containing or conducting the engine oil, i.e. the oil serving for the lubrication of the engine, and in particular also to lead away components of this engine oil which vaporized upon operation of the engine (oil vapor).

For various reasons, venting into the environment is not possible or is undesired. In the case of traditional engines, this venting is effected into the air intake pipe of the combustion engine, for instance into the part of said pipe lying between an air filter and the carburetor, so that the oil vapors from the engine compartment are also burned in the combustion chambers or cylinders of the engine. With this type of venting, considerable problems are encountered, namely inter alia the contamination of the air intake pipe, of the carburetor, and of the operating parts present in the air intake pipe and/or the carburetor due to deposits of oil, etc.

The object of the present invention is to provide a device by which the removal of oil and/or soot is possible in a reliable manner and which accordingly can be used as soot filter and, in particular however, also as oil filter or oil separator in combustion engines.

The device of the invention is particularly suited as oil filter or oil separator in motor vehicles and/or in combustion engines. In this case, due to the feeding of fresh air the temperature of which is lower than the temperature of the oil vapor into the inside of the drum or to the wall of said drum, cooling of the wall of the drum as well as, at the same time, cooling of the oil vapor in the individual space of the chamber surrounding the drum is effected so that condensation of the oil vapor takes place already in this partial space but to the greater part on the wall surface of the drum, and the condensed oil can be discharged as oil condensate. Passage of oil vapor through the wall surface of the rotating drum is prevented by the fact that the oil vapor condenses there immediately and, due to its relatively large surface tension, the condensed oil cannot pass through the fine-mesh wall of the drum, but is rather moved radially outward by the rotating drum or slung off from it.

DESCRIPTION OF THE DRAWINGS

The invention will be explained in further detail below with reference to a preferred embodiment. In the drawing.

Figure 1:
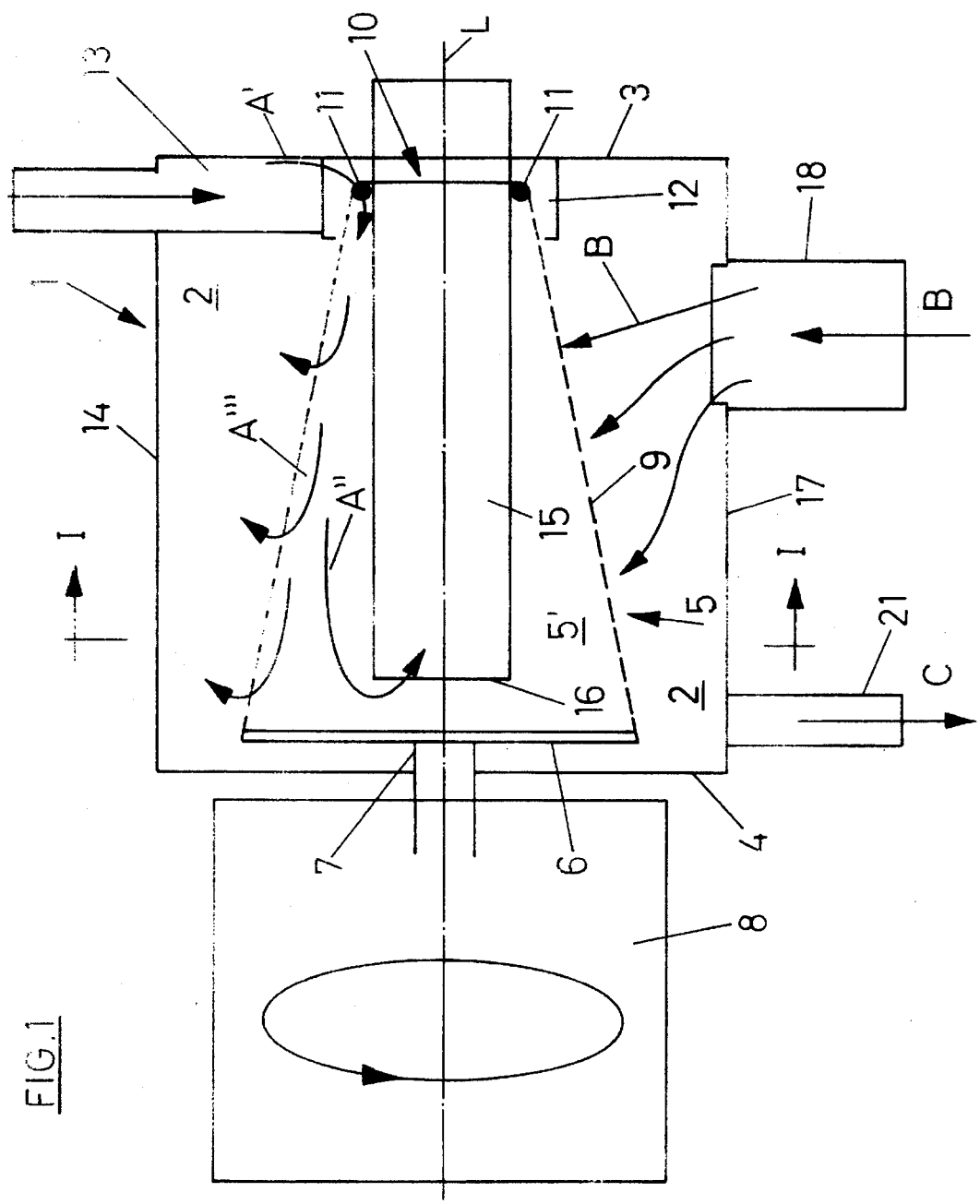
FIG. 1 shows, greatly simplified, in longitudinal section, a device in accordance with the invention which serves as oil separator.

The device shown in the figures, which is intended for use preferably in motor vehicles, serves for the removal of vaporized oil (oil vapor) or finely divided particles of oil from a stream of air or gas which emerges at the vent of an engine compartment containing or conducting an engine oil (lubricant for the engine). The engine compartment is in this connection the space which also receives the cam shaft(s), the valve tappets, as well as possibly the rocker arm of drag lever for the actuating of the valves of a combustion engine or some other space which contains the engine oil. Ordinarily, the venting of this engine compartment is effected via the air intake pipe so that oil vapors or fine particles of oil emerging at the vent are burned in the engine.

It is frequently desired to remove oil vapor or oil particles and to return them as condensate to the engine compartment in order, for instance, to avoid deposits of oil in the carburetor, in the air intake line, or on operating parts present there, etc. For this purpose, the oil separator shown in the figures is used. It consists essentially of a housing 1 which forms an inner space 2 which is closed off from the outside. In the case of the embodiment shown, the housing 1 is developed in cube or block shape with a correspondingly shaped inner space 2. It is obvious that the housing 1, and thus the inner space 2, may also have some other suitable shape.

Within the inner space 2 a drum 5 is mounted for rotation around an axis L which extends perpendicular to the two end walls 3 and 4 of the housing 1. The drum 5, which is completely received by the housing 1, is fastened for this purpose on its bottom 6 which is adjacent to the inner surface of the end wall 4 and is arranged in a plane perpendicular to the longitudinal axis L on the one end of a shaft 7 which extends in sealed manner out of the inner space 2 through the end wall 4 and can be driven in rotation around the longitudinal axis L by an electric motor 8 which is provided outside the housing 1 on it or on the end wall 4. The shaft 7 is in this connection, for instance, the output shaft of the electric motor 8.

The drum 5 consists, in addition to the closed bottom 6 made, for instance, from a blank of corrosion-resistant metal plate, also of a wall 9 which is developed with rotational symmetry to the longitudinal axis L and surrounds said longitudinal axis, the wall being formed by a fine-mesh metal grid, which also consists of a corrosion-resistant metal, for instance of a corrosion-resistant steel. Furthermore, the screen-like shell 9 is of frustoconical development in such a manner that the circular inner diameter of the drum 5 decreases from the bottom 6 to the other, open end of the drum 5 which is opposite said bottom. On the open end 10, the wall is preferably reinforced by a ring 11 which concentrically surrounds the longitudinal axis L, i.e. the ring 11 defines a circular opening in the drum 5 at the end 10.

The end 10 of the drum 9 extends into an auxiliary chamber 12 which is formed on the inner surface of the end wall 3 and which surrounds the drum 5 in the region of the end 10 over a partial axial length which constitutes only a fraction of the total axial length of the drum. The auxiliary chamber 12 is connected to a tubular connection 13 which, sealed-off from the inner space 2, is passed through the upper wall 14 arranged parallel to the longitudinal axis L and perpendicular to the end walls 3 and 4, and serves for the feeding of cold fresh air (arrow A).

Through the end wall 3 there is conducted in sealed manner a length of pipe 15 which is coaxial to the longitudinal axis L and the open end of which which extends into the inner space 5' of the drum 5 is adjacent the bottom 6, spaced from it by an amount which again constitutes merely a fraction of the total axial length of the drum 5. At its other end, the length of pipe 15, which is also open there, is conducted in sealed fashion outwards through the end wall 3, for connection to a carburetor (not shown) of an internal combustion engine.

Figure 2:
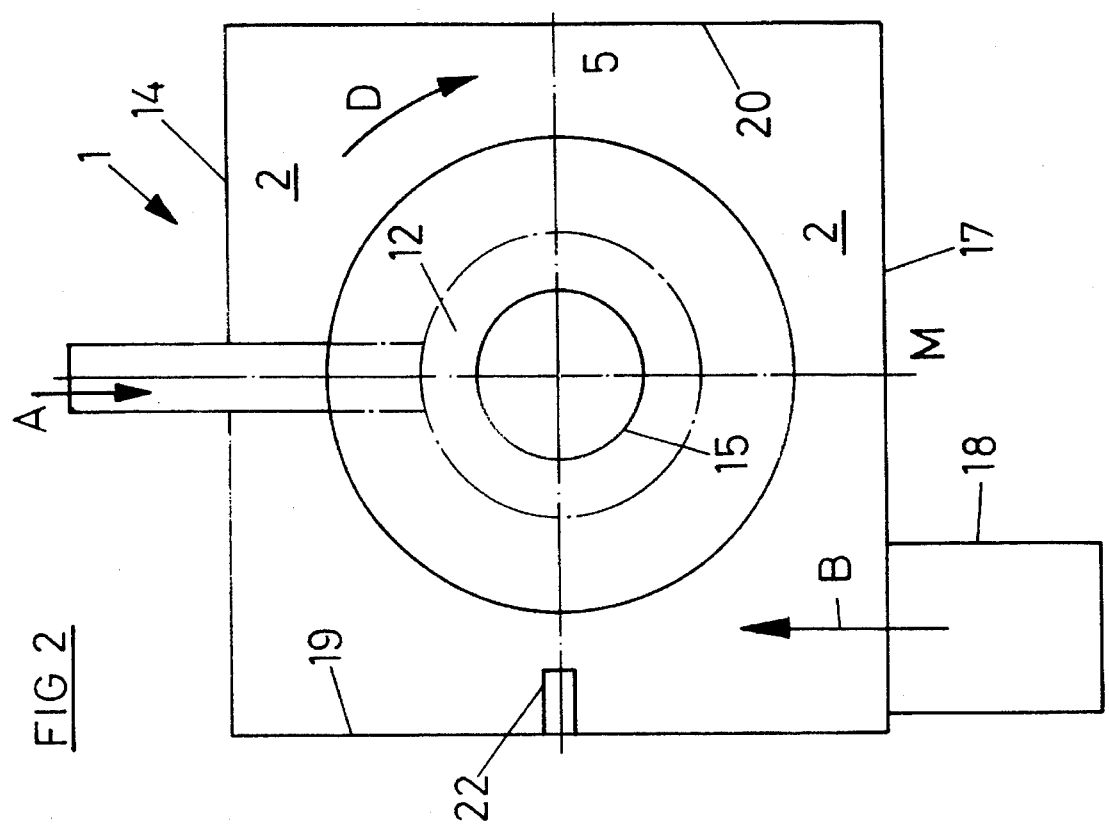
FIG. 2 is a section along the line I—I of FIG. 1.

In the bottom wall 17 which is arranged parallel to the wall 14 and spaced from it, there is provided a connection 18 via which the oil vapor is fed, as shown by the arrow B, to the oil separator or the individual space of the inner space 2 which surrounds the drum 5. As shown in the figures, in the embodiment shown the connection 18 is so arranged that, in the direction of the longitudinal axis L, it is closer to the end wall 3 than the end wall 4 and thus also closer to the end 10 of the drum 5 which extends practically over the entire length of the inner space 2 formed between the end walls 2 and 3 than to the bottom 6, i.e. the connection 18 is located in the region of a part of the drum 5 at which the latter has a smaller diameter than the bottom 6. Furthermore, the connection 18 is laterally displaced with respect to a central plane M which contains the longitudinal axis L and extends perpendicular to the wall 14 and the bottom wall 17 so that the oil vapor enters into the space 2 approximately tangentially to the drum 5, as indicated by the arrow B in FIG. 2. In the embodiment shown, the connection 18 is arranged in the direct vicinity of one of the two side walls 19 and 20 which lie perpendicular to the end walls 3 and 4, as well as perpendicular to the walls 14 and 17.

On the bottom wall 17, in the immediate vicinity of the end wall 4, there is another connection 21 which debouches into the inner space 2 and via which the oil condensate which has deposited can be discharged as indicated by arrow C, namely, for instance, back into the engine chamber. The arrow D in FIG. 2, finally, also indicates the direction of rotation of the drum 5, i.e. this direction of rotation is in the same direction at the opening of the connection 18 into the inner space 2 as the direction of flow (arrow B) of the entering oil vapor.

The diameter of the opening surrounded by the ring 11 is somewhat greater than the outside diameter of the length of pipe 15.

The manner of operation of the oil separator can be described as follows:

The connection 13 is connected via a branch to the air intake pipe of an internal combustion engine so that cold fresh air is fed via this connection 13 as indicated by the arrow A, namely to the auxiliary chamber 12. The connection 18 is connected to the vent of the engine compartment. The connection 21 also leads to the engine compartment. The end of the length of pipe 15 extending out of the housing 1 is connected to the carburetor.

For the operation of the oil separator, the electric motor 8 is connected, so that the drum 5 rotates around the longitudinal axis L in the direction indicated by the arrow D.

The fresh air which is fed via the connection 13 enters in the region of the auxiliary chamber 12 through the grid-shaped wall 9 and, in particular, also through the annular slot formed between the ring 11 and the outer surface of the length of pipe 15 into the inner space 5' of the drum 1 (arrow A') and is finally discharged via the open end 16 of the length of pipe 15 towards the carburetor (arrow A"), as a result of the suction action of the engine. By the movement of rotation of the drum 5 and by the centrifugal force produced thereby, the fresh air fed passes temporarily also through the screen-like wall 9 into the part of the inner space 2 surrounding the drum 5 (arrow A'"), but then flows again through the wall 9 and is discharged via the length of pipe 15, as indicated by arrow A". By means of the streams of air A', A" and A'", the drum 5 is continuously cooled over its entire wall 9. By the flow of fresh air A'", a cooling or reduction of the temperature of the oil vapor present in the inner space 2 around the drum 5 or of the oil-vapor air-gas mixture also takes place, so that there is, in part, a condensation of the oil vapor already in the part of the inner space 2 surrounding the drum 5, but particularly on the outer surface of drum 5, and the oil condensate which collects on the inner surface of the bottom 17 can discharge via the connection 21. By the fine screen-like development of the wall 9, oil vapor or condensed oil which has a relatively high surface tension is prevented from passing through the wall 9 into the inner space 5'. Oil condensing on the outer surface of the wall 9 is thrown off outwards by the rotary movement of the drum 5 and then finally passes back, via the connection 21, into the engine compartment (arrow C).

As has been described above and, in particular, also shown in FIG. 2, the housing 1 forms an inner space 2 which is also of block or cube shape corresponding to the development of said housing, but in particular in the sectional planes perpendicular to the longitudinal axis L has a cross section which differs from circular, namely a square cross section in the embodiment shown. By this cross sectional shape the result is obtained that upon the rotation of the drum 5 around the longitudinal axis L, a volume of air which rotates together with the drum cannot form in the part of the inner surface which surrounds the drum. The square cross section thus counteracts the formation of a volume of air which rotates together with the drum and thus forms, so to speak, a "baffle" which counteracts this co-rotation.

The same effect is obtained if the housing has a rectangular cross section or else a triangular cross section or a different polygonal cross section, for instance a hexagonal cross section.

In principle, there is also the possibility of providing further baffles, particularly in the form of ribs, ledges or plates 22 protruding into the inner space 2 within the housing.

The invention has been described above with reference to one embodiment. It is obvious that changes and modifications are possible without thereby going beyond the inventive concept.

Thus, it is possible, for instance, for the wall 9 of the drum 5 to consist of several layers. Furthermore, it is also possible to develop the device as a soot filter, in which case soot-laden gases, for instance exhaust gases of a diesel engine, are fed via the connection 18 and the purified exhaust gases, i.e. those freed of the particles of soot, are discharged via the pipe length 15. The particles of soot as well as unburned particles of fuel present are separated out on the rotating drum 5 and burned there (with suitable development of the wall 9 of the drum 5 of a catalytically active material) catalytically and/or in particular after the slinging-off from the rotating drum 5 in the part of the inner space 2 surrounding this drum by the feeding of thermal energy, the inner space 2 then being developed as combustion chamber of an afterburner.

Furthermore, it is of course also possible to provide a different drive, for instance an exhaust-gas drive, instead of the electric motor 8.

I claim:

1. A device for removing oil or soot from a stream of gas or vapor, said device comprising:

a) at least one drum which is arranged in a closed housing, said drum having an axis around which it is rotatable, with said drum forming an inner chamber therewithin for the housing, said drum having at least a portion of a wall thereof comprised of a plurality of openings which form a screen structure and through which the inner chamber of the drum and an outer chamber, formed inside the closed housing and surrounding the drum, are in communication;

b) means for rotating said drum around the drum axis;

c) at least one first connection element debouching in one of said chambers for feeding of the stream of gas or vapor; and d) a second connection element, debouching into the other chamber for a discharge of a stream of gas or vapor from which oil or soot has been removed.

2. A device according to claim 1, wherein said at least one first connection element debouches into the outer chamber surrounding the drum and the second connection element debouches into the inner chamber of the drum.

3. A device according to claim 1, wherein the drum is a conical drum.

4. A device according to claim 1, wherein the drum has a bottom which is arranged perpendicular to the drum axis and an open end opposite said bottom, with one of said connection elements extending through said open end into the inner chamber of the drum.

5. A device according to claim 4, wherein the connection element extending into the inner chamber of the drum is formed by a length of a pipe which is coaxial to the drum axis.

6. A device according to claim 4, wherein the connection element which extends into the inner chamber of the drum comprises an opening which is directly adjacent the bottom of the drum.

7. A device according to claim 1, wherein the device comprises at least one third connection element for feeding fresh or cool air into the inner chamber of the drum.

8. A device according to claim 1, wherein the drum has an open end and wherein there is provided at least one third connection element for feeding fresh or cool air to the open end of the drum.

9. A device according to claim 8, said device further comprising an auxiliary chamber into which the open end of the drum extends and into which said third connection element for feeding fresh or cool air debouches.

10. A device according to claim 1, wherein, said device further comprises a fourth connection element on a bottom wall of the outer chamber for discharging oil condensate, whereby the device functions as an oil separator.

11. A device according to claim 1, wherein the outer chamber has a non-circular, polygonic cross-section with cross sectional planes perpendicular to the drum axis.

12. A device according to claim 11, wherein the outer chamber has a quadrilateral cross-section.

13. A device according to claim 11, wherein the outer chamber has an hexagonal cross-section.

14. A device according to claim 1, wherein said device further comprises baffles within the outer chamber which counteract a rotary movement of the gas or vapor.

15. A device according to claim 1, wherein the means for rotating the drum comprises an exhaust-gas drive.

16. A device according to claim 4, wherein the connection element which extends into the inner chamber of the drum comprises an opening which is spaced from the bottom of the drum by a distance which is substantially smaller than an axial length of the drum between the open end and bottom of the drum.

17. A device according to claim 1, wherein said device further comprises at least one third connection element for feeding fresh or cool air onto the wall of the drum.

18. A device according to claim 1, wherein the drum has a bottom which is arranged perpendicular to the drum axis and an open end opposite to said bottom, and wherein there is provided at least one third connection element for feeding fresh or cool air to the open end of the drum.

* * * * *